United States Patent [19]

Hirota et al.

[11] Patent Number: 4,879,335

[45] Date of Patent: Nov. 7, 1989

[54] BLACK LIQUID COLORANT AND POLYESTER FIBERS DOPE-DYED THEREWITH

[75] Inventors: Fumio Hirota, Tokyo; Tsutomu Kado, Kawagoe; Shosuke Oku; Noboru Watanabe, both of Sabae, all of Japan

[73] Assignees: Toyo Ink Mfg. Co., Ltd., Tokyo; Nippon Ester Company Ltd., Okazaki City, both of Japan

[21] Appl. No.: 99,534

[22] Filed: Sep. 22, 1987

[30] Foreign Application Priority Data

Sep. 30, 1986 [JP] Japan .................. 61-229775

[51] Int. Cl.$^4$ .................. C08K 9/02; C08L 67/02
[52] U.S. Cl. .................. 524/495; 524/496; 524/604; 524/605; 106/478; 423/460
[58] Field of Search ............... 524/495, 496, 605, 604; 106/307, 478; 423/460

[56] References Cited

U.S. PATENT DOCUMENTS

| | | | |
|---|---|---|---|
| 3,023,118 | 2/1962 | Donnet | 423/460 |
| 3,226,244 | 12/1965 | Jordan | 423/460 |
| 3,992,218 | 11/1976 | Suetsugu et al. | 106/478 |
| 4,075,156 | 2/1978 | Johnson | 524/496 |
| 4,208,318 | 6/1980 | Ono et al. | 524/88 |
| 4,444,866 | 4/1984 | Sakai | 430/220 |
| 4,639,272 | 1/1987 | Ito et al. | 524/504 |

FOREIGN PATENT DOCUMENTS

| | | |
|---|---|---|
| 49-54451 | 5/1974 | Japan . |
| 49-87792 | 8/1974 | Japan . |
| 50-141612 | 11/1975 | Japan . |
| 50-142626 | 11/1975 | Japan . |
| 52-77162 | 6/1977 | Japan . |
| 52-111926 | 9/1977 | Japan . |
| 52-111927 | 9/1977 | Japan . |
| 53-35835 | 9/1978 | Japan . |
| 54-6034 | 1/1979 | Japan . |
| 54-34348 | 3/1979 | Japan . |
| 54-74839 | 6/1979 | Japan . |
| 54-83994 | 7/1979 | Japan . |
| 58-149311 | 9/1983 | Japan . |
| 58-167654 | 10/1983 | Japan . |
| 60-45689 | 3/1985 | Japan . |
| 60-45690 | 3/1985 | Japan . |

OTHER PUBLICATIONS

Henry Payne, Organic Coating Technology, 11/13/61, p. 911.

Primary Examiner—Lewis T. Jacobs
Assistant Examiner—David Buttner
Attorney, Agent, or Firm—Flynn, Thiel, Boutell & Tanis

[57] ABSTRACT

A black liquid colorant for dope dyeing of polyester fibers, comprising 5–50 wt % carbon black obtained by wet-oxidation with peroxide and subsequent neutralization of a gas phase oxidized carbon black, and 95–50 wt % liquid dispersion medium such as liquid polyester. Black polyester fibers, typically polyethylene terephthalate fibers, dope-dyed with preferably 3–15 wt % base on the polyester of said black liquid colorant, have a deep blackness with a bluish tone and neither polymer deterioration nor filament breakage is observed.

8 Claims, No Drawings

BLACK LIQUID COLORANT AND POLYESTER FIBERS DOPE-DYED THEREWITH

BACKGROUND OF THE INVENTION

1. Field of the Invention

The present invention relates to dope dyeing in black of polyester fibers, more particularly, black liquid colorants for the dope dyeing of polyester fibers, which have high carbon black contents, are little liable to deteriorate the polyester fibers and can minimize a reddish tone characteristic of carbon blacks, and to polyester fibers dope-dyed with the black liquid colorants.

2. Related Art Statement

Dope-dyed black polyester fibers have been manufactured by the addition of carbon black during polymerization of polyesters or at any steps from polymerization to fiber-formation. The obtained black polyester fibers have been extensively used for manufacturing fabrics to make up, for example, school-uniforms, etc.

However, the dope-dyed black polyester fibers obtained by direct addition of carbon blacks and fabrics made thereof have been considerably reddish as compared with those post-dyed with black dyes. Moreover, they have had drawbacks that the carbon blacks they contain have insufficient dispersibilities and numerous coarse particles are therefore observed in the obtained black polyester fibers. Those coarse particles that are liable to cause filter cloggings, filament breakages, etc. in the spinning step are considered to be attributed to agglomeration of the carbon blacks during the manufacture of polyester fibers, or poor wettabilities of the carbon blacks with polyester resins. In order to eliminate the reddish tone and prevent the agglomeration, there have so far been proposed a combined use of copper phthalocyanine green (Japanese Patent Application Laid-open No. 49-87,792) and a combined use of copper phthalocyanine blue (Japanese Patent Application Publication No. 35,835/78). However, polyester fibers obtained by these proposed processes have not yet had a satisfactory shade and still exhibit an appreciably reddish or yellowish tone.

Further, the dope dyeing processes wherein carbon blacks are directly added during the polyester polymerization, have disadvantages such that heavy staining of polymerization tanks necessitates installation of additional tanks for exclusive use in the process, as well as time- and labor-consuming cleaning work.

As a dope dyeing process to eliminate the above disadvantages, there have been known processes using precolored pellets and color concentrates the precolored pellet processes have scarcely been put into practice due to high cost, technical difficulties such as deterioration of resin, etc.

The processes which utilize color concentrates comprising a polyester resin and a high concentration of pigments or dyes dispersed therein have also various shortcomings. Namely, (1) technical difficulties are encountered in dispersing a high concentration of pigments or dyes during the manufacture of the color concentrates, (2) drying of the resin prior to the preparation of the color concentrates, crystallization of the color concentrate after the preparation and, in addition, further occasional drying after the preparation are required, so that energy consumption goes up in the manufacture of the color concentrates, (3) since the polyester resins to be used for manufacturing the color concentrates have a thermal history of at least two heatings including a thermal history at the time of molding, the inherent viscosity (IV) of the molded products is lowered, and (4) the necessity to dry the color concentrates when molded, will require the installation of an exclusive drying equipment for color concentrates, or drying of a mixture of natural resin with color concentrate in a drying machine, which makes color changeovers difficult to be dealt with.

As a colorant to eliminate such difficulties in the dope dyeing by color concentrate of polyester fibers, liquid colorants wherein a certain kind of liquid polyester is used as a dispersion medium have been proposed in Japanese Patent Application Laid-open No. 60-45,689. Notwithstanding the liquid colorants have many advantages as a colorant for polyester fibers, some problems remain unsolved when the liquid colorants are practically used in the dyeing of the polyester fibers. That is, in the case of liquid colorants, low carbon black contents in the polyester fibers are caused, because the volume of the colorant to be added to the polyester is restricted due to slippage of the molten polymer mass which increases with the volume of the added liquid colorant in extruders or mixers and further a large oil absorption of the carbon black itself lowers the carbon black content in the liquid colorants.

Therefore, we, the inventors, studied improvements in flowability of liquid colorants comprising an ordinary, low pH carbon black, having polar groups such as carboxylic groups or the like introduced thereinto by oxidation in a gaseous phase. However, we have found that although the gas phase oxidized ordinary carbon black can raise the jetness level to a certain degree, nevertheless an intended satisfiable jetness level cannot yet be reached and moreover practical problems occur, such as deterioration of polyester fibers.

In U.S. Pat. No. 3,992,218, there is disclosed a process for manufacturing colorants by flushing wherein furnace blacks having a pH value of at least 7 are wet-oxidized in an aqueous medium, mixed with a liquid vehicle, and then dehydrated to obtain colorants. It is shown in the above patent specification that when these colorants are used for inks, paints, and the like, it is preferred to use, as the liquid vehicle, toluene, xylene, mineral spirits and other hydrocarbon type solvents; butanol and higher alcohols; natural oil varnish, e.g., linseed oil varnish or tung oil varnish; synthetic resin varnish and the like, while when the colorants are used for polyvinyl chloride, it is preferred to use a plasticizer such as dioctyl phthalate, dibutyl phthalate or the like. However, from an aspect of the efficiency in removing the carbon black from aqueous media to liquid vehicles, the use of liquid vehicles, such as alcohols, e.g., butanol; plasticizers, e.g., phthalates; nonionic surface active agents, and the like, which have a reciprocal solubility in aqueous media, is not suitable for the flushing. Further, the use of solvents, such as alcohols, e.g., butanol; hydrocarbons, e.g., toluene, xylene and mineral spirits, and the like, as a liquid vehicle, is also not suitable for coloring polyester fibers. Thus, in the manufacture by flushing of the colorants for polyester fibers, there have been disadvantages such that employable liquid vehicles are limited in a very narrow range. Furthermore, the colorants manufactured by a process wherein a furnace black having a pH value of at least 7 is wet-oxidized in an aqueous medium and dried, without being subjected to the flushing, and then only mixed with a liquid vehicle, have had drawbacks such that a poor dispersibility of carbon black in polyester fibers dope-dyed therewith is liable to cause filament breakages.

SUMMARY OF THE INVENTION

As a result of assiduous studies conducted to solve problems as mentioned above in the dope dyeing with liquid colorants of polyester fibers and to thereby provide polyester fibers with a deep blackness, the inventors have found that carbon blacks obtained by a wet oxidation treatment with peroxides of gas phase oxidized carbon blacks and followed by neutralization, can reduce the reddish tone characteristic of carbon blacks, increase the jetness, and can lower the viscosity of the liquid colorants, thereby increasing the carbon black content, so that the dope-dyed polyester fibers are provided with a desirable deep blackness as intended. Thus, the present invention has been accomplished.

An object of the present invention is to provide dope-dyed polyester fibers with a deep blackness having substantially no reddish tone characteristic of carbon blacks.

Another object of the invention lies in a black liquid colorant having a high blackness level and a viscosity low enough to allow the carbon black content to increase in the dope-dyed polyester fibers.

The above objects of the invention is attained by a black liquid colorant for dope-dyeing of polyester fibers which comprises 5–50 weight % oxidation-neutralization-treated carbon black obtained by subjecting a gas phase oxidized carbon black to a wet oxidation treatment with a peroxide and a subsequent neutralization, and 95–50 weight % liquid dispersion medium, and by polyester fibers dope-dyed with the black liquid colorant.

DETAILED DESCRIPTION OF THE INVENTION

As the gas phase oxidized carbon blacks to be used in the present invention, mention may be made of channel blacks, furnace blacks and the like which preferably have an average particle diameter of about 14–35 nm.

When the average particle diameter is less than about 14 nm, the elimination of the reddish tone characteristic of carbon black will tend to become difficult, and if it is in excess of about 35 nm, the dope-dyed polyester fibers tend to decrease in blackness.

Further, the gas phase oxidized carbon black is preferred to have a pH value not exceeding 4.0. When the gas phase oxidized carbon black has pH higher than 4.0, the resulting liquid colorants will increase in viscosity, and the dope-dyed polyester fibers tend to somewhat decrease in blackness.

In the present invention, the gas phase oxidized carbon black is, if required, after having been mixed with an aqueous medium, subjected to a wet oxidation treatment with a peroxide. The wet oxidation treatment is preferred to be performed by mixing the gas phase oxidized carbon black with an aqueous medium such as water, water-alcohol, water-surfactant, or the like, as high efficient, stable performances can be thereby effectuated. Further, the peroxide to be employed in the invention may be appropriately selected from hydrogen peroxide; metal peroxides such as sodium peroxide, potassium peroxide and the like; peroxo-acids such as perchloric acid, permanganic acid and the like; and per-acid salts such as potassium permanganate and the like. The peroxides may be used as aqueous solutions or dispersions.

It is appropriate that the peroxides are added in an amount of 0.5–50 parts per 100 parts of gas phase oxidized carbon black by weight. In case of less than 0.5 part by weight, the oxidation will tend to be insufficiently effected, while, even if in excess of 50 parts by weight, the effect will not appreciably increase with the amount of the peroxide, so that it will induce economical disadvantages.

To carry out the wet oxidation treatment, the aqueous medium and the gas phase oxidized carbon black are mixed together and agitated at a temperature of about 20~70° C., usually 30~50° C., followed by admixing of the peroxide. Alternatively, the peroxide and the aqueous medium may be previously mixed together and further admixed with the gas phase oxidized carbon black to be suspended therein.

The neutralizing agent to be employed for the neutralization of the wet oxidation treated carbon black may be appropriately selected from water-soluble alkalis such as sodium hydroxide, potassium hydroxide and the like.

To the separation of the carbon black from the aqueous medium after the oxidation treatment, though any general, practical techniques may be applicable, usually applied are, for example, decantation separation, centrifugal dehydration, etc., followed by drying. Thus, a wet oxidation-neutralization-treated carbon black is obtained.

In the present invention, employable liquid dispersion media are not particularly limited but include plasticizers, such as dioctyl phthalate, diisodecyl adipate, and the like; vegetable oils and epoxidized vegetable oils, such as soybean oil, linseed oil, epoxidized soybean oil, epoxidized linseed oil, and the like; and other known liquid dispersion media, such as liquid paraffins, liquid polybutene, nonionic surface active agents, and the like. In view of heat resistance and carbon black dispersion stability, it is preferred to use liquid polyesters. The liquid polyesters that are in liquid form at normal temperatures can be obtained by reacting a polycarboxylic acid with a polyol, as main components, and have at least three ester linkages in their molecule. Preferable liquid polyesters are condensates of an aliphatic or aromatic dicarboxylic acid, such as adipic acid, sebacic acid, azelaic acid, glutamic acid, terephthalic acid, isophthalic acid, phthalic acid, phthalic anhydride, and the like, with a dihydric alcohol, such as ethylene glycol, propylene glycol, butylene glycol, and the like, as main structural components. Other than the above dicarboxylic acids and dihydric alcohols, use may be properly made of monocarboxylic acids such as oleic acid and the like, and polycarboxylic acids such as trimellitic acid and the like, as the acidic component, and monohydric alcohols such as n-octyl alcohol and the like, and polyhydric alcohols such as dipentaerythritol and the like, as the alcoholic component.

The black liquid colorants according to the present invention can be prepared by using a dispersion machine such as triple roll mill, ball mill, sand mill, attritor, kneader and the like, or combinations thereof.

The black liquid colorants according to the present invention may be blended with other pigments or dyes as well as additives such as antistatic agents, anti-oxidants and the like, depending on purposes, to the extent that the blackness of the dope-dyed polyester fibers is not substantially impaired. For example, the blending of phthalocyanine derivatives disclosed in Japanese Patent Application Laid-open No. 58-167,654 is preferred for further increases of non-agglomerating properties and bluing effects of the wet oxidation-neutralization-treated carbon blacks according to the present invention.

Polyester resins to form the polyester fibers of the present invention are not specifically limited insofar as they are of fiber grade. For example, employable are aromatic polyester resins such as polyethylene terephthalate, polybutylene terephthalate and the like, and copolyester resins comprising 70 mol % or more of the recurring units of ethylene terephthalate, butylene terephthalate or the like.

The fiber grade polyester resin mixed well with the black liquid colorant of the present invention is melt-spun and drawn with a spinning machine to form filament yarns. The black liquid colorant is mixed in an amount of usually 3-15 parts, preferably 5-12 parts, per 100 parts of the fiber grade polyester resin by weight. When the black liquid colorant is mixed in an amount less than 5 parts per 100 parts of the fiber grade polyester resin by weight, the coloring power tends to decrease, while if in excess of 12 parts by weight, the resulting fibers tend to decrease in physical properties.

Particular reasons why the carbon blacks prepared by the wet oxidation with peroxides and subsequent neutralization of gas phase oxidized carbon blacks exhibit a prominent effect, have, not yet been elucidated thoroughly but are accounted for as follows.

As compared with conventional oxidized carbon blacks that have been treated under very severe oxidizing conditions in a gaseous phase, the carbon blacks which are prepared by further oxidation treatment, under mild conditions, such as oxidation with peroxides, specifically under moderate conditions, for example, when wet, of the already gas phase oxidized carbon blacks, have more affinities with liquid dispersion media, particularly liquid polyesters, by virtue of polar groups formed on the surfaces of the carbon blacks. Therefore, the carbon blacks of the present invention exhibit better wettabilities and lower viscosities as well as higher coloring powers than the conventional carbon blacks. The above characteristic tendency is considered to be retained even after the neutralization. Further, it is preferred to use wet oxidation-neutralization-treated carbon blacks prepared from gas phase oxidized carbon blacks of pH not higher than 4.0, because it is conjectured that the surfaces of the gas phase oxidized carbon blacks with pH not higher than 4.0 have already been oxidized to a considerable degree so that the further oxidation under mild conditions can provide surfaces in a uniform oxidized state. Accordingly, the carbon blacks obtained by neutralizing those uniformly oxidized carbon blacks can dope-dye polyester fibers without causing deterioration of the polyester fibers.

The invention is illustrated in more detail in the following examples. All parts given below denote parts by weight.

EXAMPLE 1

Two hundred and fifty parts of a gas phase oxidized carbon black "Mitsubishi Carbon Black MA-11" (pH 3.2, average particle diameter 29 nm, manufactured by Mitsubishi Chemical Industries Ltd.) were added to 1,000 parts of water, the temperature of which was then elevated to 40° C. Two hundred parts of 20 weight % hydrogen peroxide aqueous solution were further added thereto and the mixture was reacted at 40° C. for 24 hours. Next, by the addition of 1.0 N-sodium hydroxide aqueous solution, the pH of the obtained carbon black product was adjusted to 7.3, then filtered and dried to provide an oxidation-neutralization-treated carbon black.

Fifteen parts of the resulting oxidation-neutralization-treated carbon black and 85 parts of an adipate-based liquid polyester "ADK CIZER P-300" (average molecular weight 3000, manufactured by Adeka Argus Chemical Co., Ltd.) were kneaded together and a liquid colorant was obtained. The viscosity at 25° C. as measured in a Brookfield viscometer of the obtained liquid colorant is shown in Table 1.

One hundred parts of polyethylene terephthalate (inherent viscosity $\eta = 0.63$) were admixed with 10 parts of the obtained liquid colorant, which were melt-spun into 10 denier dope-dyed filaments from a spinning apparatus and drawn 3.3 times at 80° C. to form 3 denier filaments. The IV retention and the appearance (by visual observation) of the resultant filaments, and the carbon black dispersion in the resultant filaments (by microscopic observation) are shown in Table 1.

The IV retention of undyed filaments was 94.0% against the IV of the polyester resin (100%) before spinning.

Comparative Example 1

A liquid colorant was obtained in the same manner as Example 1, except that "Mitsubishi Carbon Black MA-11" was used in lieu of the oxidation-neutralization-treated carbon black. The viscosity at 25° C. of the obtained liquid colorant is shown in Table 1.

Using the obtained liquid colorant, 3 denier dope-dyed filaments were produced in the same manner as Example 1. The IV retention and the appearance of the resultant filaments, and the carbon black dispersion in the resultant filaments are shown in Table 1.

Comparative Example 2

A liquid colorant was obtained in the same manner as Example 1, except that "Raven 1250" (carbon black of pH 6.0, average particle diameter 21 nm, manufactured by Columbian Carbon Co., Inc.) was used in lieu of "Mitsubishi Carbon Black MA-11". The viscosity at 25° C. of the obtained liquid colorant is shown in Table 1.

Using the obtained liquid colorant, 3 denier dope-dyed filaments were produced in the same manner as Example 1. The IV retention and the appearance of the resultant filaments, and the carbon black dispersion in the resultant filaments are shown in Table 1.

Comparative Example 3

A liquid colorant was obtained in the same manner as Example 1, except that "Mitsubishi Carbon Black #2350" (pH 2.0, average particle diameter 15 nm, manufactured by Mitsubishi Chemical Industries Ltd.) was used in lieu of the oxidation-neutralization-treated carbon black. The viscosity at 25° C. of the obtained liquid colorant is shown in Table 1.

Using the obtained liquid colorant, 3 denier dope-dyed filaments were produced in the same manner as Example 1. The IV retention and the appearance of the resultant filaments, and the carbon black dispersion in the resultant filaments are shown in Table 1.

Comparative Example 4

Fifteen parts of furnace carbon black "Mitsubishi Furnace Black MCF-88" (pH 8.0, average particle diameter 18 nm, manufactured by Mitsubishi Chemical Industries Ltd.) were added to 70 parts of water. Then, $48 \times 10^6$ mole of 63 weight % of $HNO_3$ per unit of specific surface area ($m^2/g$) of the carbon black were added thereto and the mixture was reacted at room temperature for 24 hours. Next, the reaction product was filtered, washed with water, and dried to provide a wet-oxidation treated carbon black.

A liquid colorant was obtained in the same manner as Example 1, except that the wet-oxidation treated carbon black was used in lieu of the oxidation-neutralization-treated carbon black. The viscosity at 25° C. of the obtained liquid colorant is shown in Table 1.

Using the obtained liquid colorant, 3 denier dope-dyed filaments were produced in the same manner as Example 1. The IV retention and the appearance of the resultant filaments, and the carbon black dispersion in the resultant filaments are shown in Table 1.

TABLE 1

| Example No. | Viscosity of Liquid Colorant (poise) | IV Retention (%) | Dispersion of Carbon Black | Appearance of Filaments |
| --- | --- | --- | --- | --- |
| Example 1 | 1200 | 91.5 | Good | Black with bluish tone |
| Comparative Example 1 | 1800 | 82.0 | Good | Filament breakages |
| Comparative Example 2 | 2250 | 92.6 | A little agglomeration | Black with yellowish tone |
| Comparative Example 3 | 4580 | 78.3 | A little agglomeration | Black with bluish tone, filament breakages |
| Comparative Example 4 | 1450 | 92.2 | A little agglomeration | Black with bluish tone, filament breakages |

EXAMPLE 2

Two hundred and fifty parts of a gas phase oxidized carbon black "Mitsubishi Carbon Black MA-100" (pH 3.0, average particle diameter 22 nm, manufactured by Mitsubishi Chemical Industries Ltd.) were added to 1,000 parts of water, the temperature of which was then elevated to 30° C. One hundred parts of potassium permanganate were further added thereto and the mixture was reacted at 30° C. for 24 hours. Next, by the addition of 1.0 N-sodium hydroxide aqueous solution, the pH of the obtained carbon black product was adjusted to 7.0, then filtered and dried to provide an oxidation-neutralization-treated carbon black.

Thirty parts of the resulting oxidation-neutralization-treated carbon black and 70 parts of an adipate-based liquid polyester "BAA-15" (average molecular weight 1500, manufactured by Daihachi Chemical Industry Co., Ltd.) were kneaded together and a liquid colorant was obtained. The viscosity at 25° C. as measured in a Brookfield viscometer of the obtained liquid colorant is shown in Table 2.

One hundred parts of polyethylene terephthalate the same as used in Example 1 were admixed with 6 parts of the obtained colorant, which were melt-spun into 10 denier dope-dyed filaments from a spinning apparatus and drawn 3.3 times at 80° C. to form 3 denier filaments.

The surface color of the resultant filaments was measured and the result is shown in Table 2.

EXAMPLE 3

Thirty parts of the oxidation-neutralization-treated carbon black prepared in Example 2, 3 parts of copper phthalocyanine derivative represented by the chemical formula:

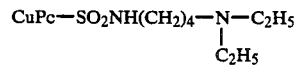

and 67 parts of "BAA-15" were kneaded together and a liquid colorant was obtained. The viscosity of the obtained liquid colorant is shown in Table 2.

Using the obtained liquid colorant, 3 denier dope-dyed filaments were produced in the same manner as Example 2. The surface color of the resultant filaments was measured and the result is shown in Table 2.

Comparative Example 5

A liquid colorant was obtained in the same manner as Example 2, except that "Mitsubishi Carbon Black MA-100" was used in lieu of the oxidation-neutralization-treated carbon black. The viscosity of the obtained liquid colorant is shown in Table 2.

Using the obtained liquid colorant, 3 denier dope-dyed filaments were produced in the same manner as Example 2. The surface color of the resultant filaments was measured and the result is shown in Table 2.

Comparative Example 6

A liquid colorant was obtained in the same manner as Example 2, except that "Mitsubishi Carbon Black #44" (pH 7.5, average particle diameter 21 nm, manufactured by Mitsubishi Chemical Industries Ltd.) was used in lieu of the oxidation-neutralization-treated carbon black. The viscosity of the obtained liquid colorant is shown in Table 2.

Using the obtained liquid colorant, 3 denier dope-dyed filaments were produced in the same manner as Example 2. The surface color of the resultant filaments was measured and the result is shown in Table 2.

TABLE 2

| Example No. | Viscosity of Liquid Colorant (poise) | Color Measurement@ | | |
| --- | --- | --- | --- | --- |
| | | L* | a* | b* |
| Example 2 | 68,000 | 14.3 | −0.01 | −0.34 |
| Example 3 | 74,200 | 13.8 | −0.06 | −0.45 |
| Comparative Example 5 | 100,600 | 15.2 | 0.17 | 0.01 |
| Comparative Example 6 | 125,000 | 15.8 | 0.33 | 0.04 |

@The denotation of color measurement was in accordance with JIS-Z-8729-1980 that stipulates the specification of color of materials according to the CIE 1976, (L*a*b*) space.

From the color measurement in Table 2, it is understood that the filaments obtained in Example 2 have a deep blackness with a bluish tone, and those obtained in Example 3 have a deep blackness with a more bluish tone, whereas those obtained in Comparative Examples 5 and 6 have a less blackness with a red-yellowish tone.

As explained above and demonstrated by way of examples, the black liquid colorant of the present invention has features such as low viscosity and high carbon black content, and by dope dyeing with the black liquid colorant of the invention, polyester fibers having a deep blackness with a bluish tone are obtainable without causing any polymer deterioration and filament breakages.

What is claimed is:

1. Black dope-dyed polyester fibers which comprise a polyester blended with a black liquid colorant comprising 5-50 weight % of oxidation-neutralization-treated carbon black obtained by subjecting a gas phase oxidized carbon black to a wet oxidation treatment with a peroxide and a subsequent neutralization with an alkali, and 95-50 weight % of liquid dispersion medium.

2. Black dope-dyed polyester fibers as claimed in claim 1, wherein at least 70 mole % of the recurring units of said polyester are ethylene terephthalate units.

3. Black dope-dyed polyester fibers as claimed in claim 1, wherein the polyester is of fiber grade and blended with 3-15% by weight, based on the polyester, of the black liquid colorant.

4. Black dope-dyed polyester fibers as claimed in claim 3, wherein the amount of the black liquid colorant is 5-12% by weight based on the polyester.

5. Black dope-dyed polyester fibers as claimed in claim 1 in which said peroxide consists of hydrogen peroxide.

6. Black dope-dyed polyester fibers as claimed in claim 1 in which said alkali consists of sodium hydroxide.

7. Black dope-dyed polyester fibers as claimed in claim 1 in which said alkali consists of potassium hydroxide.

8. Black dope-dyed polyester fibers as claimed in claim 1 in which said gas phase oxidized carbon black has an average particle diameter of from 14 nm to 35 nm and a pH of not higher than 4.0, said wet oxidation treatment is carried out at a temperature of 20° to 70° C., in an aqueous reaction medium, by mixing from 0.5-50 parts by weight of said peroxide per 100 parts by weight of said gas phase oxidized carbon black, and said neutralization is effected by mixing a water-soluble alkali selected from the group effected by mixing a water-soluble alkali selected from the group consisting of sodium hydroxide and potassium hydroxide, in said reaction mixture.

* * * * *